US007809815B2

(12) United States Patent
Goldberg et al.

(10) Patent No.: US 7,809,815 B2
(45) Date of Patent: *Oct. 5, 2010

(54) SYSTEM AND METHOD FOR MANAGING A FLOW OF NETWORK STATUS MESSAGES AT A NETWORK OPERATIONS CONSOLE

(75) Inventors: Harold Jeffrey Goldberg, Lakewood, NJ (US); John L. Berry, Rumson, NJ (US)

(73) Assignee: Net2Phone, Inc., Newark, NJ (US)

( * ) Notice: Subject to any disclaimer, the term of this patent is extended or adjusted under 35 U.S.C. 154(b) by 624 days.

This patent is subject to a terminal disclaimer.

(21) Appl. No.: 11/265,476

(22) Filed: Nov. 3, 2005

(65) Prior Publication Data
US 2006/0168200 A1    Jul. 27, 2006

Related U.S. Application Data

(63) Continuation of application No. 09/575,677, filed on Jun. 22, 2000, now Pat. No. 6,981,035.

(51) Int. Cl.
*G06F 15/173* (2006.01)
(52) U.S. Cl. .................................................... 709/223
(58) Field of Classification Search ................ 709/223, 709/220, 227, 230
See application file for complete search history.

(56) References Cited

U.S. PATENT DOCUMENTS

| 5,611,038 | A | | 3/1997 | Shaw et al. |
| 5,664,093 | A | | 9/1997 | Barnett et al. |
| 5,956,509 | A | * | 9/1999 | Kevner ........................ 719/330 |
| 5,982,753 | A | | 11/1999 | Pendleton et al. |
| 6,006,016 | A | | 12/1999 | Faigon et al. |
| 6,279,033 | B1 | | 8/2001 | Selvarajan et al. |
| 6,427,132 | B1 | * | 7/2002 | Bowman-Amuah .......... 703/22 |
| 6,430,607 | B1 | | 8/2002 | Kavner |
| 6,501,377 | B2 | * | 12/2002 | Ebata et al. .................. 340/506 |
| 6,529,475 | B1 | | 3/2003 | Wan et al. |
| 6,701,342 | B1 | * | 3/2004 | Bartz et al. .................. 709/200 |
| 6,892,236 | B1 | * | 5/2005 | Conrad et al. ................ 709/224 |
| 6,976,090 | B2 | * | 12/2005 | Ben-Shaul et al. .......... 709/246 |
| 7,082,422 | B1 | * | 7/2006 | Zirngibl et al. ............... 706/45 |
| 2005/0038832 | A1 | | 2/2005 | Feigenbaum |

OTHER PUBLICATIONS

BSR 64000, Broadband Services Router 64000 Product Detail, Motorola, Inc., http://broadband.motorola.com/catalog/productdetail.asp? image=large&productID=191, printed on Feb. 11, 2004, 1 page.

(Continued)

*Primary Examiner*—David Y Eng
(74) *Attorney, Agent, or Firm*—Davidson Berquist Jackson & Gowdey LLP

(57) ABSTRACT

A computer based system, computer program product, and method for managing network status message data flow. A computer based system, computer program product, and method are provided for managing the flow rate of network status messages to a remote network operations console. Detailed network status is abstracted into hierarchical levels of detail so that an appropriate level of detail can be provided from a flow control daemon to the requesting network operations console without exceeding a predetermined allocation of bandwidth set aside for network status reporting.

4 Claims, 21 Drawing Sheets

OTHER PUBLICATIONS

CAS 2000, Cable Access System 2000 Product Detail, Motorola, Inc., http://broadband.motorola.com/catalog/productdetail.asp?image=large&productID=222, printed on Feb. 11, 2004, 2 pages.

CentriQ 1000 Communications Gateway Product Information and Specifications, Motorola, Inc., c2000, 2 pages.

CG4500 Communications Gateway Product Information and Specifications, Motorola, Inc., c2001, 2 pages.

CG4501 Communications Gateway Product Information and Specifications, Motorola, Inc., c2002, 2 pages.

Motorola Advanced Provisioning System Product Detail, Motorola, Inc., http://broadband.motorola.com/catalog/productdetail.asp?image=large&productID=193, printed on Feb. 11, 2004, 2 pages.

Motorola NIS Solutions—HFC Access, Motorola, Inc., c1994-2003, http://broadband.motorola.com/nis/hfc_access.html, printed on Feb. 11, 2004, 3 pages.

Motorola NIS Solutions—PacketCable, Motorola, Inc., c1994-2003, http://broadband.motorola.com/nis/packet_cable.html, printed on Feb. 11, 2004, 5 pages.

Motorola's NETsolutions Group, Motorola, Inc., c2004, http://broadband.motorola.com/noflash/netsolutions.html, printed on Feb. 11, 2004, 2 pages.

NETadvantageTM Services, Motorola, Inc., c2004, http://broadband.motorola.com/noflash/netadvantage.html, printed on Feb. 11, 2004, 2 pages.

NETwork Support Services, Motorola, Inc., c2004, http://broadband.motorola.com/noflash/networksupport.html, printed on Feb. 11, 2004, 2 pages.

SBV4200 VoIP Cable Modem Product Details, Motorola, Inc., http://broadband.motorola.com/catalog/productdetail.asp-?ProductID=208, printed on Feb. 11, 2004, 1 page.

SURFboard® SBV4200 VoIP Cable Modem Product Information and Specifications, Motorola, Inc., c2002, 2 pages.

SURFboard® VT1000 Vocie Terminal Product Information and Specifications, Motorola, Inc., c2002, 2 pages.

International Search Report mailed Sep. 6, 2006 in corresponding PCT Application No. PCT/US2004/041408.

Written Opinion of the International Searching Authority mailed Sep. 6, 2006 in corresponding PCT Application No. PCT/US2004/041408.

* cited by examiner

FIG. 6A

| NET2PHONE: RTDB STATUS | | | | | | | | |
|---|---|---|---|---|---|---|---|---|
| FILE SORT | | | | | | | | |
| | ACCOUNT | DN | CALLID | STE | TIME | HOST:CHAN | REASON VERSION | SW/PC |
| CALL INFO: | 41555405 | 2264583 | 406814 | TALK | 16:21:03 | 1@pt1:1 | p2p/21 | 000/000 |
| HANGUP | 61244754 | 3675150 | 387129 | TALK | 16:23:00 | 1@pt1:3 | p2p/21 | 000/000 |
| | 84796317 | 5688707 | 406726 | TALK | 16:20:18 | 1@pt1:4 | p2p/21 | 000/000 |
| | 31065214 | 8318509 | 407664 | DIAL | 16:26:25 | 1@pt1:5 | p2p/21 | 000/000 |
| UNLOCK | 89580047 | 8231116 | 387367 | TALK | 16:23:47 | 1@pt1:6 | 9.0/35 | 000/000 |
| | 92546032 | 8548942 | 384787 | TALK | 16:17:25 | 1@pt1:7 | p2p/21 | 000/000 |
| MESSAGE | 71864275 | 3853901 | 407618 | TALK | 16:26:17 | 1@pt1:8 | p2p/21 | 000/000 |
| | 70453191 | 6956231 | 384343 | TALK | 16:16:20 | 1@pt1:9 | 9.0/35 | 000/000 |
| CLEAR EOC | 01822748 | 9841904 | 383263 | TALK | 16:13:44 | 1@pt1:10 | p2p/21 | 000/000 |
| | 21267551 | 2381770 | 405518 | TALK | 16:12:12 | 1@pt1:12 | p2p/21 | 000/000 |
| | 202262513 | 5952195 | 387941 | TALK | 16:25:04 | 1@pt1:13 | 8.67/35 | 000/000 |
| | 852253834 | 4770230 | 388433 | TALK | 16:26:29 | 1@pt1:14 | 8.67/35 | 000/000 |
| | 39165217 | 3417966 | 387509 | TALK | 16:24:08 | 1@pt1:16 | 9.0/35 | 000/000 |
| | 73008682 | 5167556 | 387323 | TALK | 16:23:40 | 1@pt1:17 | c2p/21 | 000/000 |
| | spc2.16. | 6490965 | 407680 | DIAL | 16:26:27 | 1@pt1:18 | p2p/21 | 000/000 |
| | 40590118 | 8784244 | 407702 | TALK | 16:26:53 | 1@pt1:19 | | |

STATISTICS
TALK: 19
DIAL: 4
INIT: 0
EOC: 0

CLEAR EOC
○ MANUAL
◉ 30 SECONDS
○ 1 MINUTE
○ 5 MINUTES

CLOSE

RTDB: CALL DETAIL

- ACCT:
- DN:
- CALL_ID: 98383677
- STATE: TALK
- SS_HOST: SS.1@PT17
- CHANNEL: 6
- IP_ADDR: 169:
- TCP_PORT: 5008
- TIME_LEFT: 01:04:00
- INIT_TIME: 3/23/99 4:14:26 pm
- DIAL_TIME: 3/23/99 4:14:34 pm
- SOC_TIME: 3/23/99 4:14:51 pm
- EOC_TIME: NA
- EOC_REASON: UNK
- ELAPSED_TIME: 00:09:14
- VERSION: P2P/21

CLOSE

RTDB: REGISTRATION

- ACCOUNT:
- CUSTOMER ID
- BALANCE: $25.01  PIN: 9076
- GROUP: OTHER
- SFLAGS: 0
- STATUS: 0
- FIRST:
- LAST:
- COMPANY:
- ADDRESS 1:
- ADDRESS 2:
- CITY: EAGAN
- STATE: MN
- COUNTRY: US
- ZIP:
- PHONE:
- EMAIL: @
- SOURCE:
- REGISTRATION DATE: 9/17/98 1:52:35 PM
- LAST UPDATE: 9/18/98 6:06:09 PM
- EXPIRATION DATE: NA
- REGISTRATION IP:

CLOSE

| N2P PROCESSES | | | |
|---|---|---|---|
| MACHINE | PROCESS | STATE | PID |
| AP2 | mcd | active | 12217 |
| AP2 | misrecv | active | 7769 |
| AP2 | n2pd | active | 20125 |
| AP2 | rgmain | active | 10197 |
| AP2 | rmgr | active | 24986 |
| AP2 | rtdb | active | 8980 |
| AP3 | acctd | active | 7073 |
| AP3 | am | active | 5201 |
| AP3 | amlocal | active | 5202 |
| AP3 | cdrd | active | 5211 |
| AP3 | doorman | active | 5204 |
| AP3 | frontend | active | 10315 |
| AP3 | mcd | active | 8090 |
| AP3 | misrecv | active | 18653 |
| AP3 | n2pd | active | 24229 |

[START] [STOP] [BOUNCE] [CLOSE]
[SIGTERM] [SIGKILL] [SIGABRT]

FIG. 9

HOST STATUS

DB1 ☐ SP5 ☐ SP6 ☐ SP8 ☐ SP9 ☐ SP10 ☐ SP11 ☐ SP12 ☐ SP13 ☐ SP16 ☐ SP17 ☐ SP18 ☐ SP19 ☐ SP21 ☐ SP22 ☐ SP23 ☐ SP24 ☐

[CLOSE]

Net2Phone: ALARMS

FILE  EDIT

| TIME | SEV | ACK | HOST | PROCESS | MESSAGE | ACTION |
|---|---|---|---|---|---|---|
| Mar 23, 16:11:49 | ▨ | | ny5 | portmngr.1 | T1 Restored (Yellow Alarm) | |
| Mar 23, 16:11:48 | ▨ | | ny5 | portmngr.1 | T1 Yellow Alarm | |
| Mar 23, 15:55:56 | ▨ | | egn1 | n2pd | Reestablished contact with host | |

| 16:30:53 | SELECT ALL | REMOVE | DESELECT ALL | ACKNOWLEDGE | 0 | 2 | | | CLOSE |

FIG. 11

| USERS | | |
|---|---|---|
| NAME | IP ADDRESS | VERSION |
| santo | 169.132.4.78 | 7.12 |
| ed | 169.132.4.69 | 7.12 |
| naray | 203.248.128.82 | 6.11 |
| eli | 169.132.65.136 | 7.13 |
| nfarah | 169.132.185.209 | 7.12 |
| nabdul | 169.132.185.89 | 7.06 |
| andrian | 169.132.4.67 | 7.12 |
| geretz | 169.132.65.131 | 7.09 |
| ppiel | 169.132.185.46 | 7.06 |

CLOSE

| | Customer Number | Account Number | Balance | Field 4 | Field 5 | ... | Field n |
|---|---|---|---|---|---|---|---|
| Switch$_1$ Port 1 | | | | | | | |
| Switch$_1$ Port 2 | | | | | | | |
| Switch$_1$ Port 3 | | | | | | | |
| ... | | | | | | | |
| Switch$_1$ Port 24 | | | | | | | |
| ... | | | | | | | |
| Switch$_n$ Port 1 | | | | | | | |
| Switch$_n$ Port 2 | | | | | | | |
| Switch$_n$ Port 3 | | | | | | | |
| ... | | | | | | | |
| Switch$_n$ Port 16 | | | | | | | |

SYSTEM AND METHOD FOR MANAGING A FLOW OF NETWORK STATUS MESSAGES AT A NETWORK OPERATIONS CONSOLE

CROSS REFERENCE TO RELATED APPLICATIONS

The present application is a continuation of application Ser. No. 09/575,677, filed Jun. 22, 2000, now U.S. Pat. No. 6,981,035, the entire contents of which are herein incorporated by reference.

BACKGROUND OF THE INVENTION

The present invention is directed to systems, methods, and computer program products for managing networks including network status message traffic and more particularly, systems, methods, and computer program products for preventing data overrun between a real time status manager and a network operations console.

In a network control system (e.g., an Internet telephony control system), at least one switch (each switch controlling plural ports) is managed by at least one remote network operations console. As the number of switches and ports in the controlled network increases, the ability to remotely manage and/or monitor that network becomes an increasingly difficult challenge. The challenges posed by this problem are due to, among other things, (1) the space complexity of illustrating the status of the network in a visually compact area (e.g., on a screen) and (2) the limited amount of information that can be reliably communicated in a timely manner to a remote network operations console given bandwidth limitations.

SUMMARY OF THE INVENTION

One approach to addressing the space problem is to provide display that segments the information into a hierarchy of information. When a first portion of the hierarchy is displayed, other portions are hidden or shown in reduced detail (using one or a combination of text and graphics).

One approach to addressing the problem of potentially large information transfer is require that the network operations console be connected to the network via a connection with sufficient bandwidth. Although this is possible in connection with a hierarchical display, the present inventor has recognized that this approach limits the flexibility that would be provided by allowing a network operations console to connect to the network through any available communications channel (e.g., a dial-up connection).

One challenge, then, as presently recognized, is to develop an approach to provide reliable and timely network status information to a remote network operations console through any available communications channel without sacrificing the ability to effectively manage the network from a remote tool.

The present inventor recognized the benefit that would be derived from having a remote network management capability for managing a large network through any available communications channel. Accordingly, an object of the present invention is to provide an approach for remotely managing a large network without sacrificing the reliability or timeliness of the data received by the remote network operations console because of the bandwidth limitations of a connection (e.g., a dial-up connection, a DSL connection, or an ISDN connection).

The present inventor has also recognized that all of the available detailed network status information is not required simultaneously to effectively manage the network. Accordingly, a further object of the present invention is to provide an approach for abstracting detailed network status information into a hierarchy of increasing detail so that network status information can be presented to a network operations console at a level of detail that can preserve bandwidth, yet provide the level of information desired by a remote user (e.g., network administrator) of a network operations console.

The present inventor has also recognized that by providing a tunable data overrun prevention capability, the amount of bandwidth allocated to network status information messages being sent to a remote network operations console can be adjusted to meet the needs of those responsible for managing the network. Accordingly, a further object of the present invention is to provide a tunable capability to prevent data overrun by network status messages on connections from a remote network operations console to the network.

To address the above-described and other objects, the present inventor has invented a novel computer based system, method, and computer program product by which the amount of network status information sent to a remote network operations console could be controlled, allowing the remote management of the network with reliable and timely network status information.

In one embodiment of the present invention, a configurable data flow management daemon is configured to allocate a predetermined amount of bandwidth (e.g., certain sized messages or a total number of bytes/second in variable length messages) to be used for reporting network status information to a remote network operations console through a connection. The network status information is maintained in a hierarchical manner so that the appropriate level of detail can be provided to the remote network operations console without exceeding the predetermined bandwidth that has been allocated to network status messages by the data flow management daemon. The hierarchical representation of the network status information allows the remote network operations console user to request more detailed information on those portions of the network that are of particular interest. The data flow management daemon will then provide more detailed information for those portions of the network of concern to the remote network operations console user without exceeding its status bandwidth allocation.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 6A is a screen capture of an interface showing status of individual ports of switches selected from the interface of FIG. 5;

FIG. 7 is a screen capture of real-time call detail information for a switch specified using the interface of FIG. 6A;

FIG. 8 is a screen capture of call and account information for an on-going or completed call;

FIG. 9 is a screen capture of the statuses of hosts/gateways;

FIG. 10 is a screen capture of exemplary processes running under the control of the present system;

FIG. 11 is a screen capture of alarms that can be monitored using the interface of FIG. 4;

FIG. 12 is a screen capture of users (e.g., network administrators) that are logged in simultaneously for administering the network;

FIG. 18 is an exemplary data field structure showing network status messages of a high level of resolution;

FIGS. 20A-20C illustrate exemplary user interfaces for tracking an account of a customer selected from a list or entered manually.

DETAILED DESCRIPTION

Figure 1:
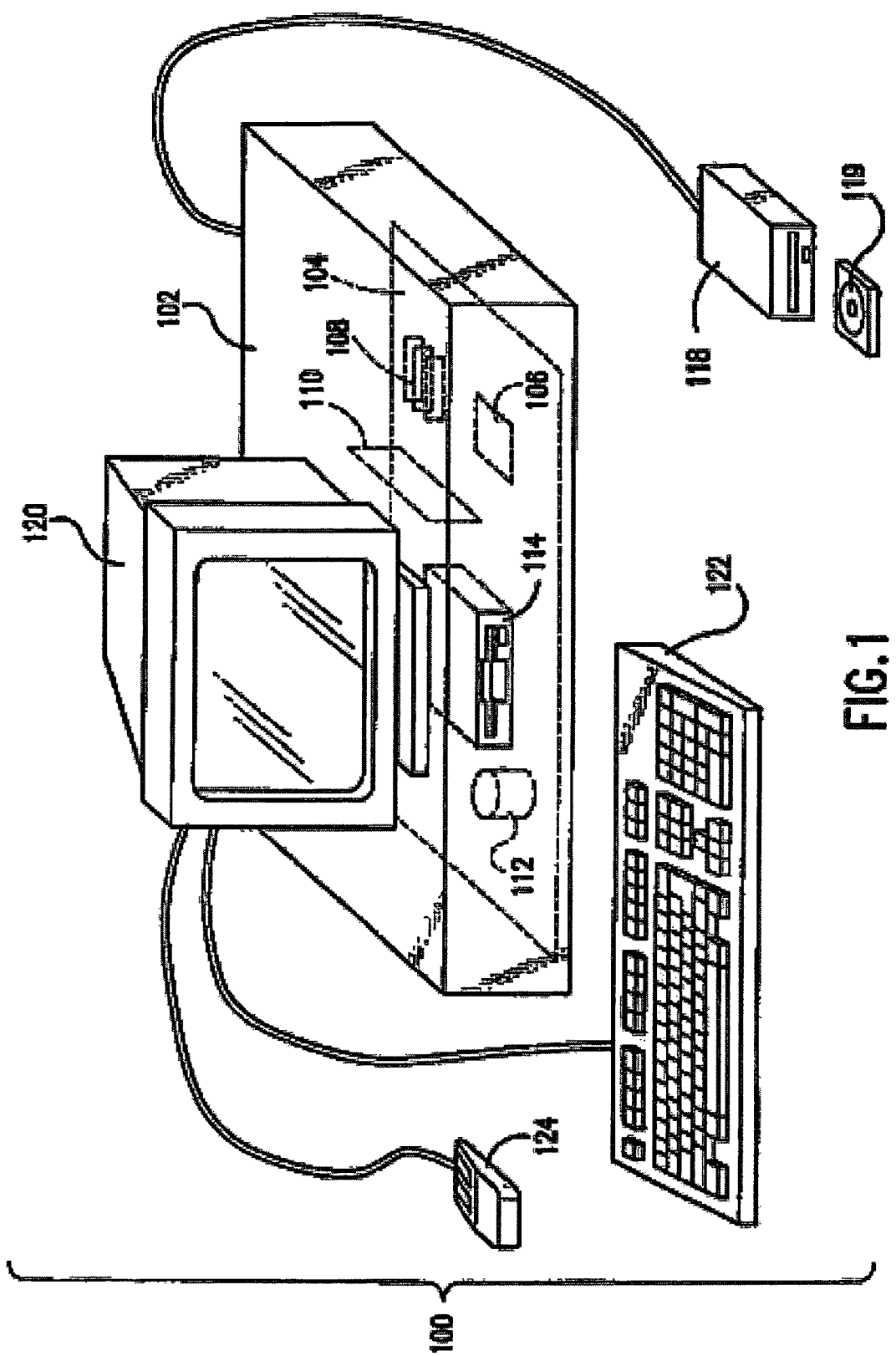
FIG. 1 is a schematic diagram of an electronics portion of the workstations used in the system.

Referring now to the drawings, wherein like reference numerals designate identical or corresponding parts throughout the several views, FIG. 1 is a schematic illustration of a computer system for managing a computer network having plural ports. A portion of the management includes managing the volume of network status messages sent to a network operations console. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of network information as reported to a network operations console.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for managing a network from a network operations consoles. The computer code devices of the present invention can be any interpreted or executable code mechanism, including but not limited to scripts, interpreters, static or dynamic link libraries, Java classes, and complete executable programs (e.g., written in Visual Basic, C, or C++).

Figure 2:
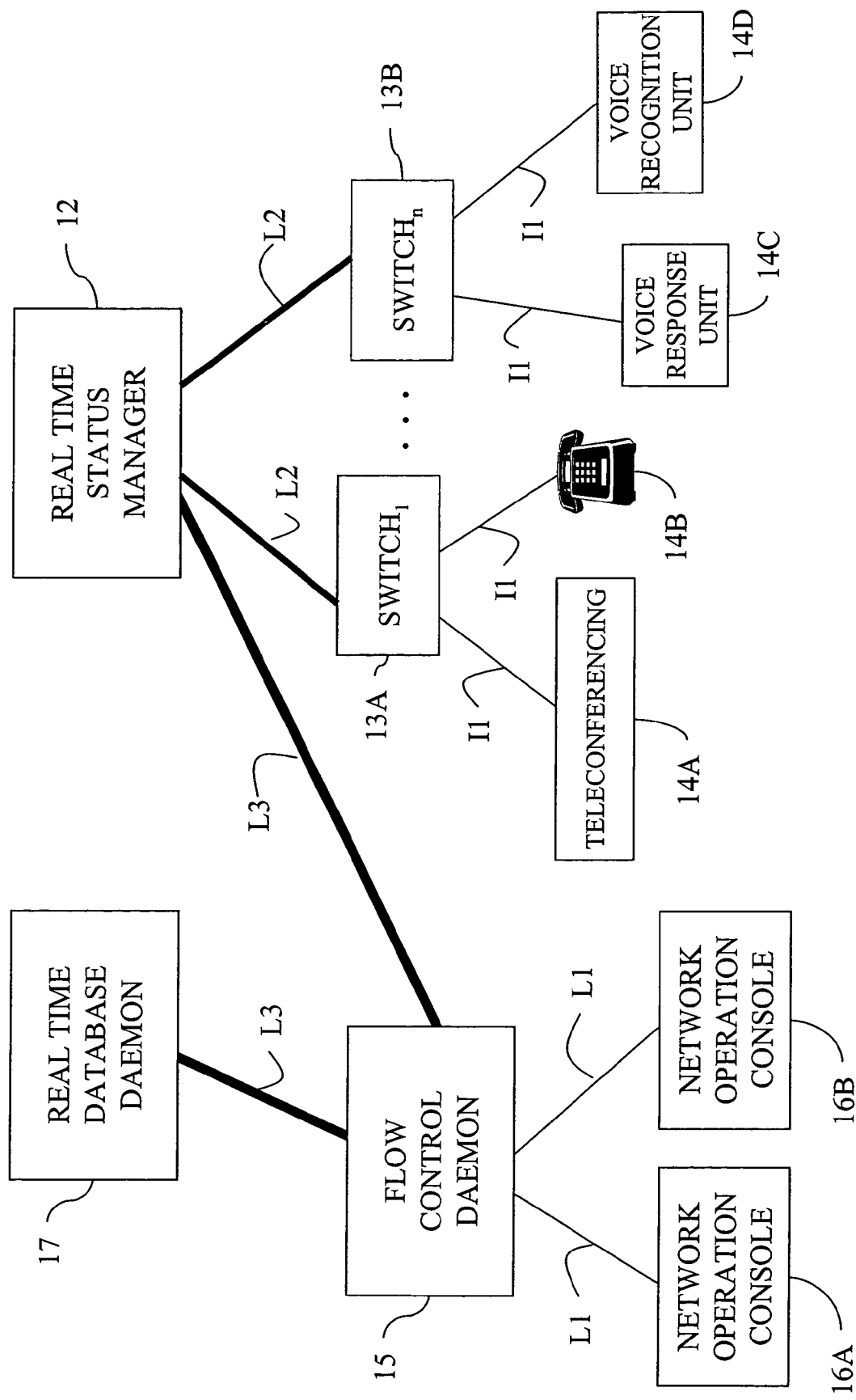
FIG. 2 is a block diagram showing an overall system configuration for one embodiment of the present invention.

As shown in FIG. 2, a controlled network includes plural switches (labeled "Switch$_1$ 13A" and "Switch$_n$ 13B"). As would be appreciated from the numbering used, an arbitrary number of switches, "n"are supported by the present invention, where n is at least one. Each of the switches 13A and 13B includes plural ports, each with a corresponding interface I1. As would be appreciated by one of ordinary skill in the art, each port may be either a physical port (e.g., connected to (1) a telephone, (2) a computer via modem, (3) a computer by Ethernet or (4) a facsimile machines) or a logical port (e.g., connected to a voice bridge, a voice response unit or a voice recognition unit) that is implemented using at least one of software and hardware. Ports may likewise connect to lines from telephone trunks (e.g., T1, E1, or T3) or adapters for any other communication channel. Switches 13A and 13B in the network are either uni-directional or bi-directional. Preferably, to allow scalability, the system utilizes fully-redundant, load-balanced, distributed processes and hardware that can grow in four ways: (1) Larger, faster single systems, (2) Multiple CPUs, (3) Multiple Systems, and (4) Multiple Platforms.

The real time status manager 12 (under control of a control program, not shown) manages the switches SWITCH$_1$ 13A and SWITCH$_n$ 13B through control lines L2. The real time status manager 12 ensures that a switch is allocated or freed as requested by a connection daemon (not shown). Such connections can be used to route telephone calls between a caller and a callee, join multiple participants on a conference call via a bridge, etc. As the switches respond to connection requests, and as users disconnect from calls, the switches 13A and 13B send per-port status updates (e.g., status changed to "dialing," status changed to "ringing," status changed to "supporting a fax," and status changed to "supporting a voice call") to a real time status manager 12.

The real time status manager 12 then provides detailed network status information concerning every port of every switch in the network to a flow control daemon 15 through a high bandwidth connection L3. The high bandwidth connection L3 may be an Ethernet local area network, an ATM network or other high bandwidth connection.

Figure 3:
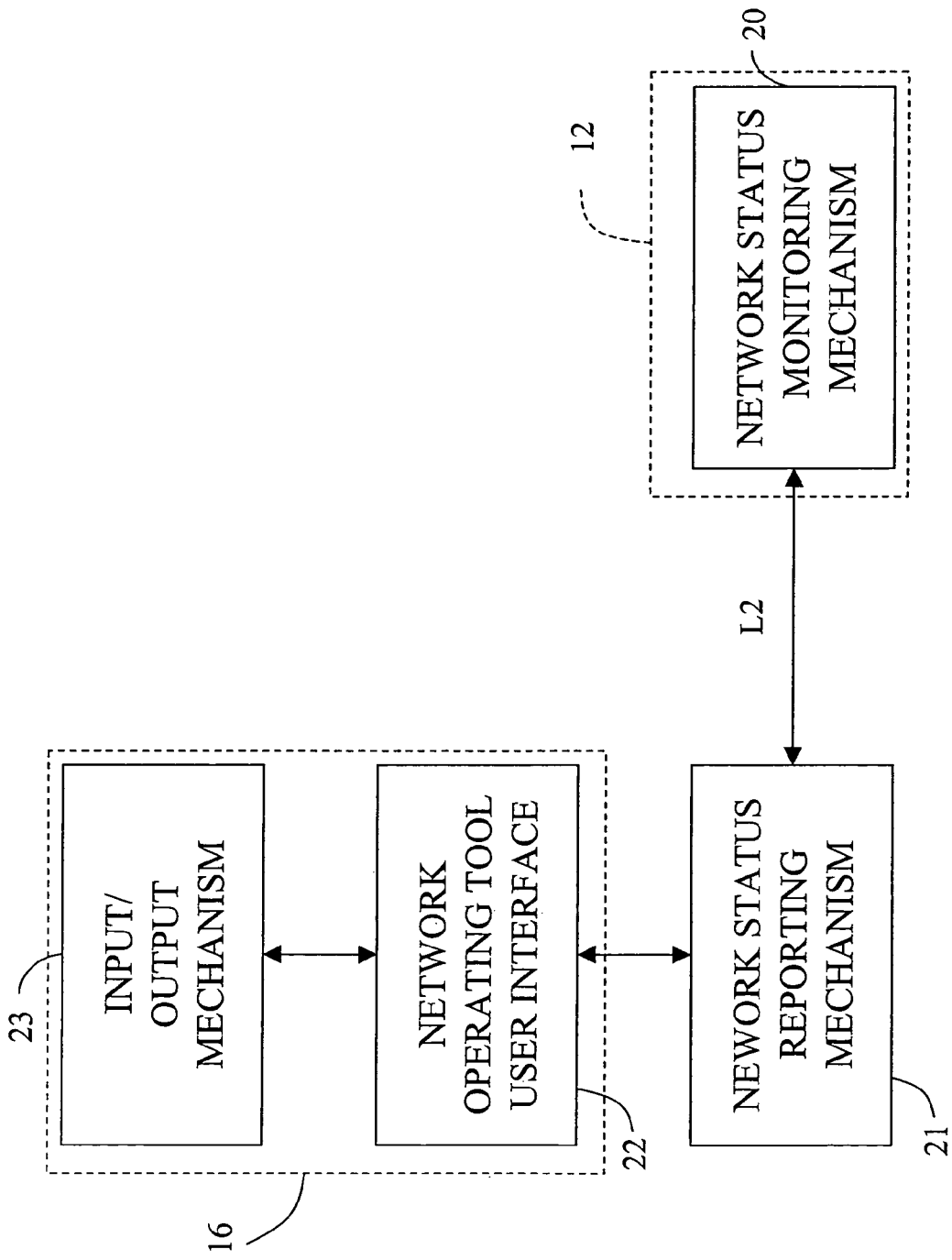
FIG. 3 is a block diagram showing mechanisms of a network operations console and a flow control daemon shown in FIG. 2.

FIG. 3 shows the mechanisms implemented by the network operations consoles 16A, 16B and the flow control daemon 15 in greater detail. The network operations consoles 16A, 16B include a network operating tool user interface 22 and an input/output mechanism 23. The flow control daemon 15 includes a network status reporting mechanism 21 that receives network status information through a network status monitoring mechanism 20 that is performed by the real time status manager 12. The network status monitoring mechanism 20 provides continuous notifications of changes in the status of ports of switches.

Generally, with reference to FIG. 2, the user of a network operations console (16A or 16B) tracks network status information through the network operating tool user interface 22. To avoid data overflows, in one embodiment, the network operations consoles 16A, 16B request status information through at least one flow control daemon 15, instead of directly from the real-time status manager 12. In an alternate embodiment, the network operations consoles 16A, 16B request status information directly from the real-time status manager 12.

Figure 4:
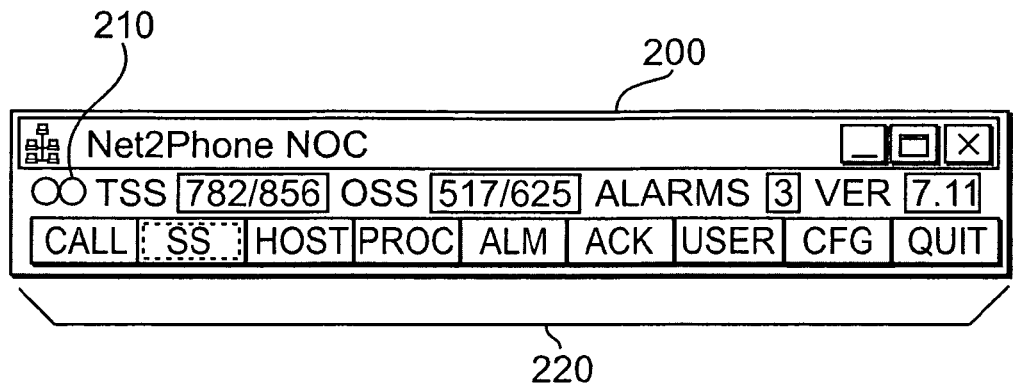
FIG. 4 is a screen capture of an exemplary initial control interface of the general graphical user interface of a network operating tool user interface.

As shown in FIG. 4, a graphical user interface-based network operations console 16A and 16B, includes a main interface 200. The main interface 200 includes a graphical icon 210 for each of the flow control daemons 15 that the network operations console 16 communications with. In the illustrated embodiment, there are two flow control daemons that can provide the interface 200 with information (as is discussed in more detail below). Since both daemons 15 are operating correctly, the both show the same color (e.g., green) such that the user can know how they operating at a glance. If one daemon 15 was experiencing mild problems, its associated icon would change to a second color (e.g., yellow) to indicate the intermittent errors. However, if severe errors were occurring or a daemon was unreachable altogether, its associated icon would be illustrated with a third color (e.g., red).

Also on the interface 200 (e.g., in the first row along with the icons 210), a summary of the status of terminating switches (labeled "TSS") and originating switches (labeled "OSS") are also provided. Thus, at a glance, the user is also able to tell overall port usage. Similarly, a numeric count or graphical indication of the number of alarms (e.g., a "switch not responding" alarm) is provided. Likewise, in one embodiment, a version number is shown to remind a user of the capabilities of the interface 200.

By selecting one of the buttons 220 of the interface 200, a user can obtain information on calls, switch statuses, hosts, processes running (e.g., on switches or computers running the flow control daemon 15), alarms, acknowledgments, users, or a configuration of the interface. Likewise, the user can choose to quit using the interface 200. In response to selecting the "SS" button, the network operations console 16A displays a scrollable list of switches (terminating and/or originating) 300 and a series of usage bars 320a and 320b representing their relative usages. When usage of a switch is below a specified threshold, the usage bars 320a indicate an "okay" condition using a first color (e.g., green). When usage of a switch is above a specified threshold, the usage bars 320b indicate a "danger" condition using a second color (e.g., red).

Figure 6A:
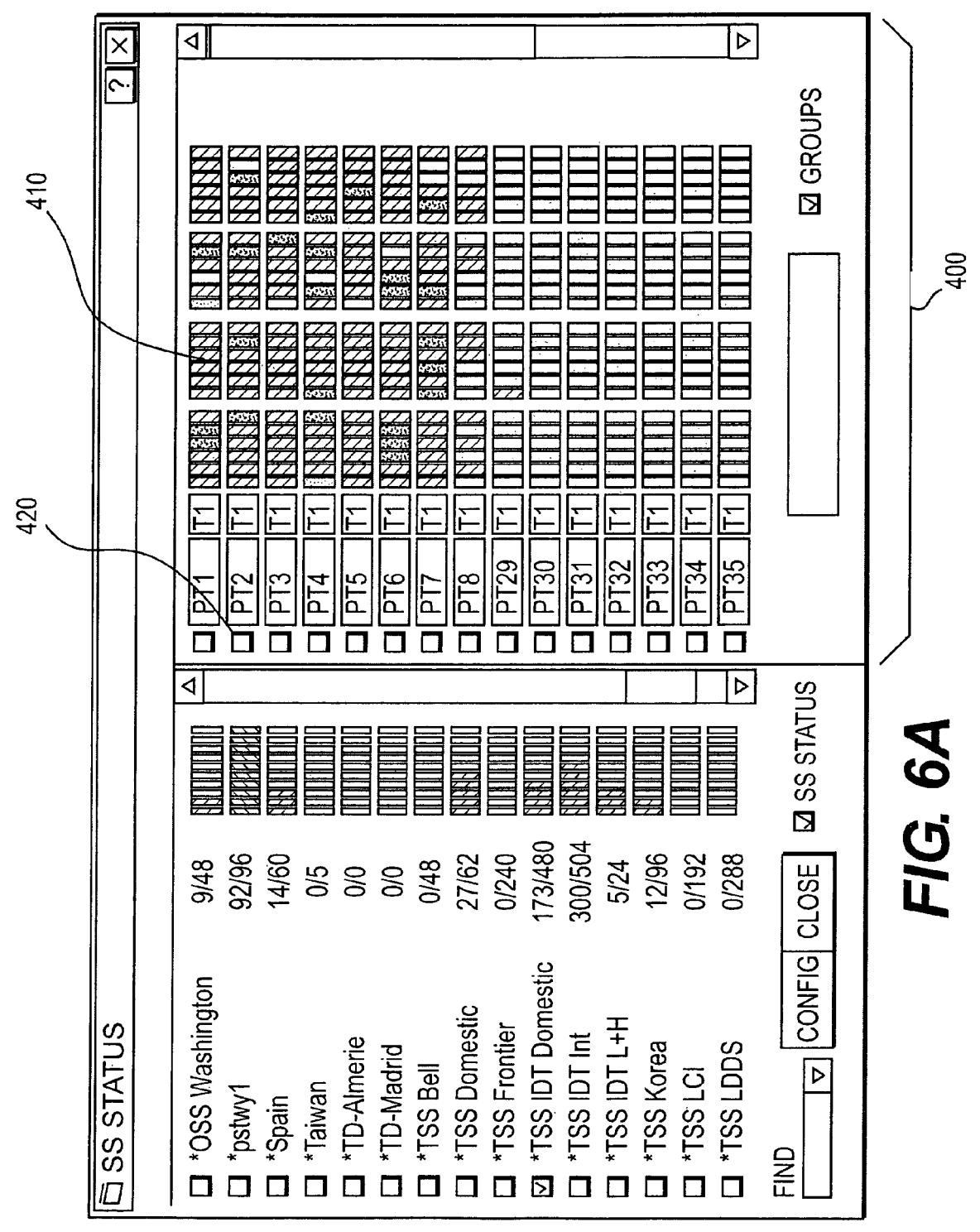

Each of the switches also has a corresponding check box 310. When the "SS Status" switch 330 is selected, additional information about each switch with a selected check box is displayed in a scrollable summary status window 400, as is shown in greater detail in FIG. 6A. The scrollable summary status window 400 includes status bars 410 which indicate a status of each (or substantially each) port in the corresponding switch. Status bars 410 can represent any number of conditions (e.g., idle, dialing, ringing, in use for fax, and in use for voice) using various colors or patterns.

Figure 6B:
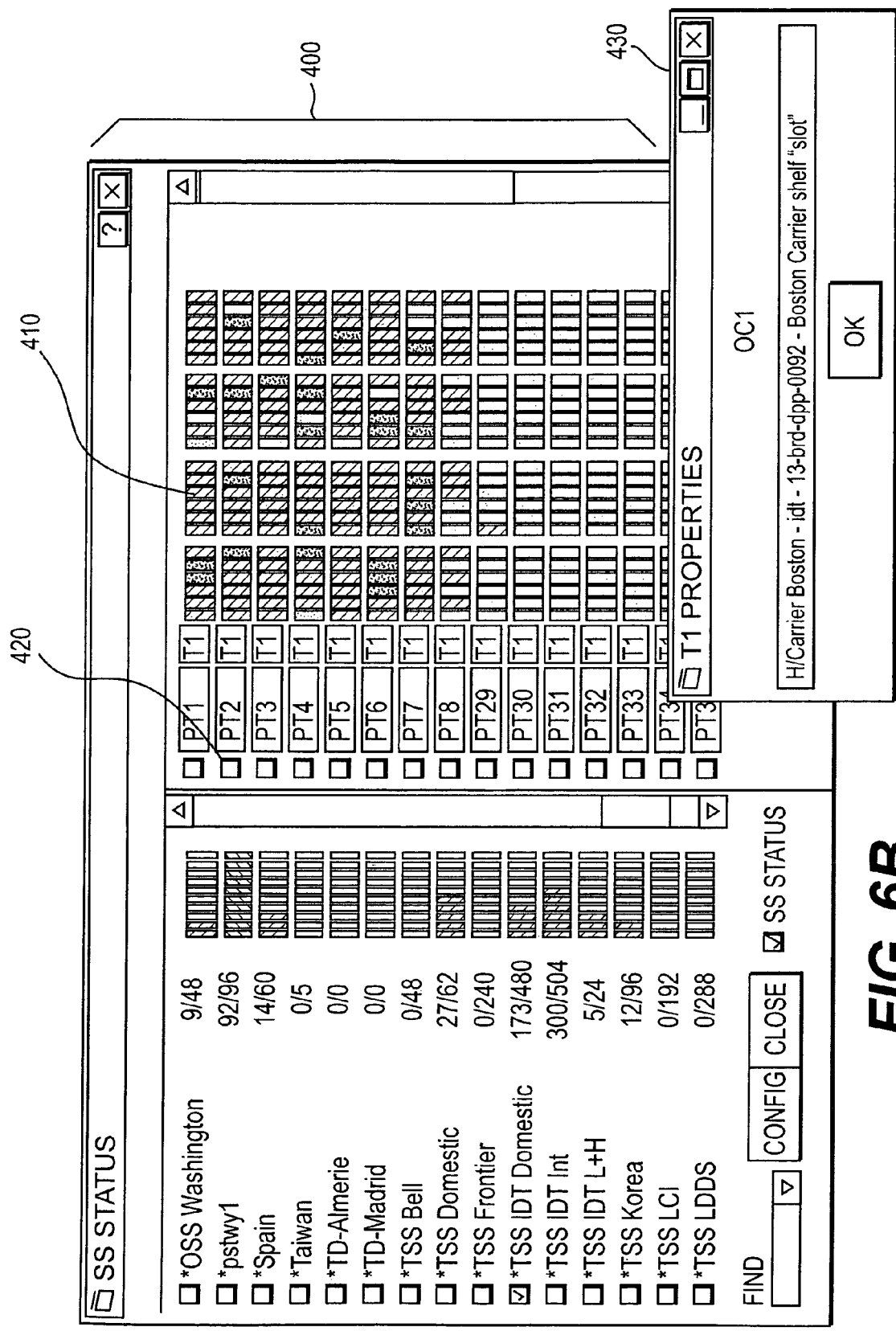
FIG. 6B is a screen capture of additional details that can be selected from a portion of the interface of FIG. 6A.

As shown in FIG. 6B, the summary status window 400 also allows the name (e.g., PT1, PT2, or OC1) of a span to be selected such that a more detailed information box 430 is displayed. The box 430 typically displays static or semi-static information about a span (as opposed to the real-time data of FIG. 7, discussed in more detail below).

Figure 5:
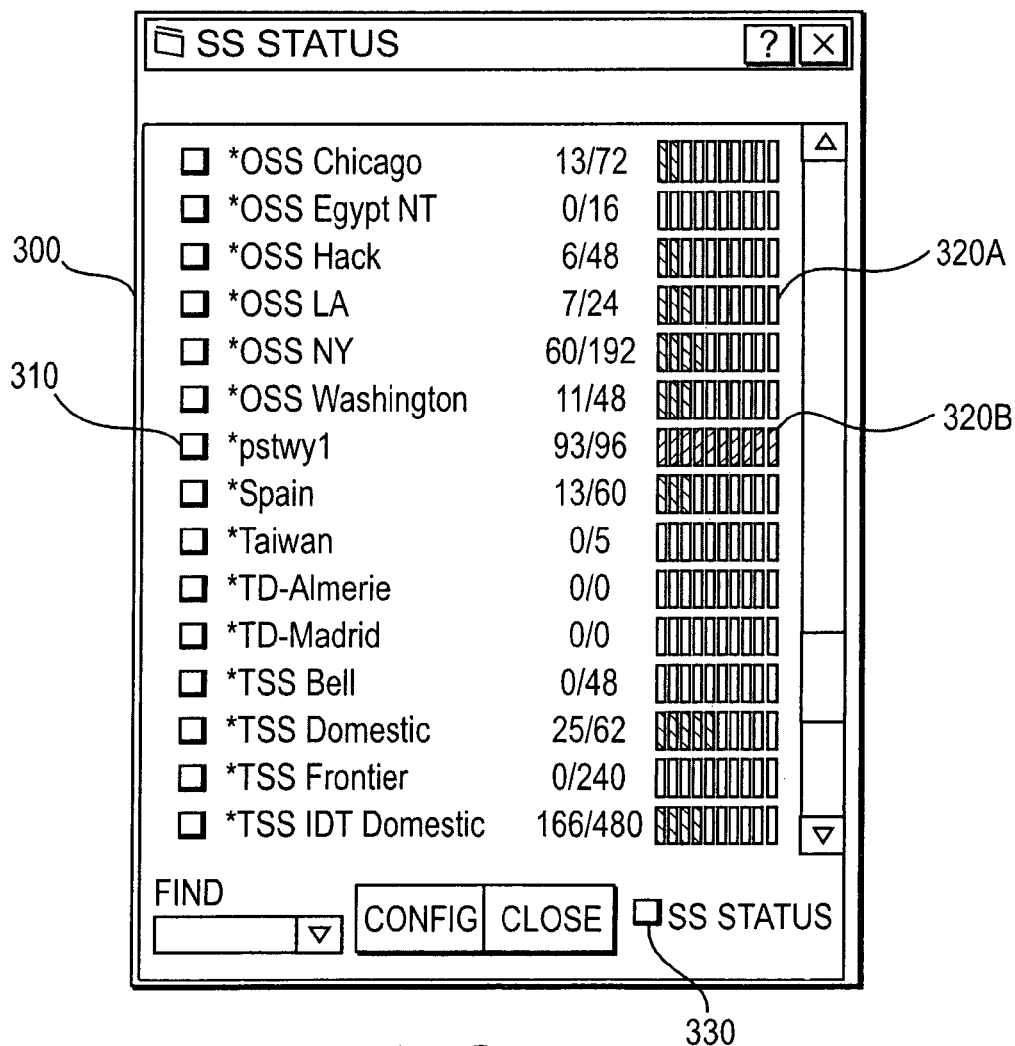
FIG. 5 is a screen capture of an interface showing an exemplary summary table showing the percentage usage of switches.

Like the smaller interface 300 of FIG. 5, the scrollable summary status window 400 also includes check boxes 420. Selecting a check box 420 triggers the network operations console 16 to display a span call summary window 500, as shown in FIG. 7. The window 500 includes account numbers, dialed numbers, call identifications, states/statuses, times, hosts, and version information about the call (e.g., whether it is a phone-to-phone (p2p) call, a PC client-to-phone (c2p) call, or a switch service being used (e.g., 9.0)). As will be discussed below in greater detail, the information in the summary status window 400 requires a greater amount of data to be transferred from the flow control daemon 15 to the console 16. As a result, the number of check boxes 420 that may be selected at any one time may be severely limited, and the operations console 16 may automatically unselect a number of other check boxes 420 each time a new check box is selected. Besides viewing information, the span call summary window 500 can also be used to select a particular port and perform additional functions on the port (e.g., get even more detailed status, hang up on the call, unlock a locked port, check/send messages to a port, or clear and end-of-call status). Generally, though, a user monitors the changes in the specified port(s)' status as new real-time messages arrive.

If a user were to select the call information, at least one of the two screens of FIG. 8 are displayed by the console 16 such that the user can identify the characteristics of the call and the corresponding user. Such call characteristics include the IP address of the call, its port, and the length of time that the call has been active. Such user characteristics include the name, address, telephone number, and account of the user.

As was discussed with reference to FIG. 4, the main interface 200 also includes a button labeled "Host." Activation of that button causes the console 16 to display another window (FIG. 9) that shows the statuses of various hosts (e.g., gateways) in the network. A user can quickly see if there are any problems that need to be corrected or logged.

Similarly, the main interface 200 also includes a button labeled "Proc." Activation of that button causes the console 16 to display another window (FIG. 10) that shows the currently running processes for controlling the network and port assignments.

Likewise, the main interface 200 also includes a button labeled "Alm." Activation of that button causes the console 16 to display another window (FIG. 11) that shows the status of any uncleared alarms. Alarms can occur to inform a user of breaks in data communication or that a switch has not changed status in a long time, indicating an error, even though the switch has not reported an actual error.

Also, the main interface 200 also includes a button labeled "User." Activation of that button causes the console 16 to display another window (FIG. 12) that shows the number of currently running consoles 16 and the users associated with those consoles.

As discussed above, in an embodiment using redundancy, a redundant flow control daemon that is identical in every way to the flow control daemon 15 also receives the detailed status information from the real time status manager 12 through a high bandwidth connection L3 but does not send messages to network operations consoles while the primary flow control daemon 15 is operational. A redundant flow control daemon provides added reliability to the system. The flow control daemon 15 is a process that resides on a networked workstation that can communicate to a network operations console 16A, 16B through a connection L1 (e.g., a dial-up connection, a DSL connection, or an ISDN connection). Such an embodiment is preferably coupled with physically separate networked centers that house completely redundant administration complexes. In progress call information and call detail can then be replicated in real time using an Active/Active Model. In fact, either center can handle entire load.

The flow control daemon 15 stores call connection information (e.g., the name, account number, and current balance) for ports of the switches in a database that is accessed through a real time database daemon 17. The flow control daemon is connected to the real time database daemon through a high bandwidth connection L3 which may be an Ethernet local area network, an ATM network, or other high bandwidth connection. The flow control daemon 15 requests call connection information from and provides updated call connection information to the database by communicating with the real time database daemon 17.

As discussed above, in one embodiment of the present invention, the real time status manager 12 provides changes in status to the flow control daemon 15. Given the potentially large number of ports in the network, providing only status change information can improve the performance of the network status reporting. The flow of network status information between the real time status manager 12 and the flow control daemon 15 through the connection L3 is continuous. The flow control daemon 15 then merges the call connection information from the real time database daemon 17 with the status information from the real time status manager 12 as needed.

The flow control daemon 15 controls the volume of merged information sent to the connected network operations consoles 16A, 16B. The number and sizes of messages that are allocated to network status information between a flow control daemon 15 and a network operations console 16A, 16B is a configurable quantity, that can be specified, for example, in a configuration file resident on the workstation on which the flow control daemon 15 resides. In other embodiments, the quantity is set via a local or remote (e.g., Web) graphical interface or by reading from a database. In yet another embodiment, the network operations console 16A, 16B transmits connection information to the flow control daemon 15 which aids in determining how much bandwidth on the connection L1 to allocate to network status messages.

As discussed above with reference to FIG. 6A, The network status reporting mechanism 21 determines, based on available bandwidth and the number of check boxes 420, the amount of network status information that should be reported back to the network operating tool user interface 22. In making this determination, the network status reporting mechanism will determine if the amount of network status information requested through the network operating tool user interface 22 exceeds the bandwidth allocated for network status messages on the link L1 to that particular network operations console 16A, 16B. If the requested amount of network status information does not exceed the allocated bandwidth, the network status reporting mechanism will provide all requested network status information. However, if the amount of network status information exceeds the allocated bandwidth, the network status reporting mechanism 21 will compensate in one of two ways. In the first way, the system provides network status information to the highest level of detail that can be accommodated without exceeding the bandwidth allocated to network status information for that particular network operations console 16A, 16B. The network status reporting mechanism 21 may also take into account dynamic network characteristics (e.g., congestion) when determining how much information to transmit. In the second way, the system automatically unchecks some number of check boxes 420 every time a new check box 420 is checked. In low bandwidth situations, only one check box 420 may be checked at a time. In such an embodiment, the check box 420 actually acts as a mutually exclusive radio button.

Generally, the system limits the number of ports whose statuses can be displayed (see FIG. 7) such that the bandwidth of the link L1 between the flow control daemon 15 and the console 16 is not exceeded. The system can then devote the remaining bandwidth not used by the real-time messages (see FIG. 7) for additional summary information (see FIG. 6A). In order to perform automatic message throttling, the flow control daemon 15 also intersperses dummy messages (or messages with special headers) that need to be acknowledged by the console before the daemon 15 will send any additional messages. This acknowledgment protocol ensures that the amount of bandwidth needed to send the real-time messages is preserved at the expense of being able to send fewer summary messages.

Figure 13:
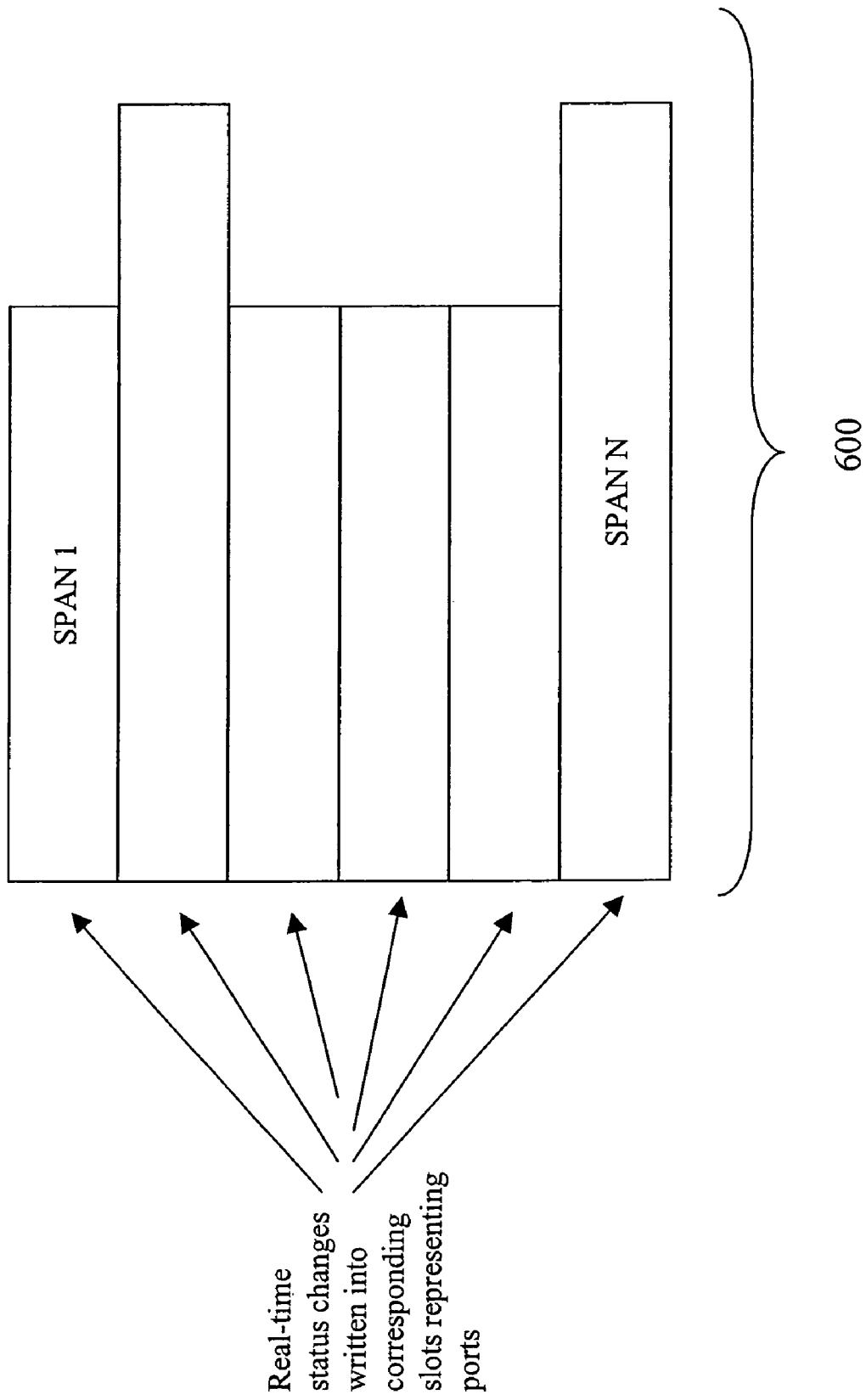
FIG. 13 is a schematic illustration of a data structure for holing real-time status updates.

As shown in FIG. 13, generally real-time status changes are received by the flow control daemon 15 from the real-time status manager 12. The changes are placed in a summary table 600 where the data structure representing spans has a sufficient amount of space to hold the status of each port. (It is possible that adjacent spans will have different numbers of ports, so the data structure preferably includes the ability to represent varying length spans.) Since the real-time information is simply changes, the table 600 is essentially updated in a random fashion (e.g., span 1, port 1 goes to ringing, then span 4, port 6 goes to end-of-call). The entire span need not be updated. After having sent out the requested real-time information, the summary information corresponding to the next span is sent out. For example, the summary information of span 1 is sent out, then real-time information, then more real-time information, then the summary information for span 2. After the summary information for Span N has been sent out, the next set of summary information to be sent out is from Span 1 again. The Span 1 summary information will include any changes to the ports of Span 1 since the last time that the summary information for Span 1 was sent out.

The network status information is sent from the flow control daemon 15 to the network operations consoles 16A, 16B using a protocol that will enforce the requisite reliability, such as TCP/IP. A reliable protocol such as TCP/IP requires acknowledgment of receipt of a number of packets prior to sending subsequent packets, and TCP/IP provides for retransmission of lost packets. By using TCP/IP, the users of network operations consoles 16A, 16B can have confidence in the information being displayed through the network operating tool user interface 22. In an embodiment where reliability is less important, a datagram protocol (e.g., UDP) may replace TCP-based messaging.

Figure 14:
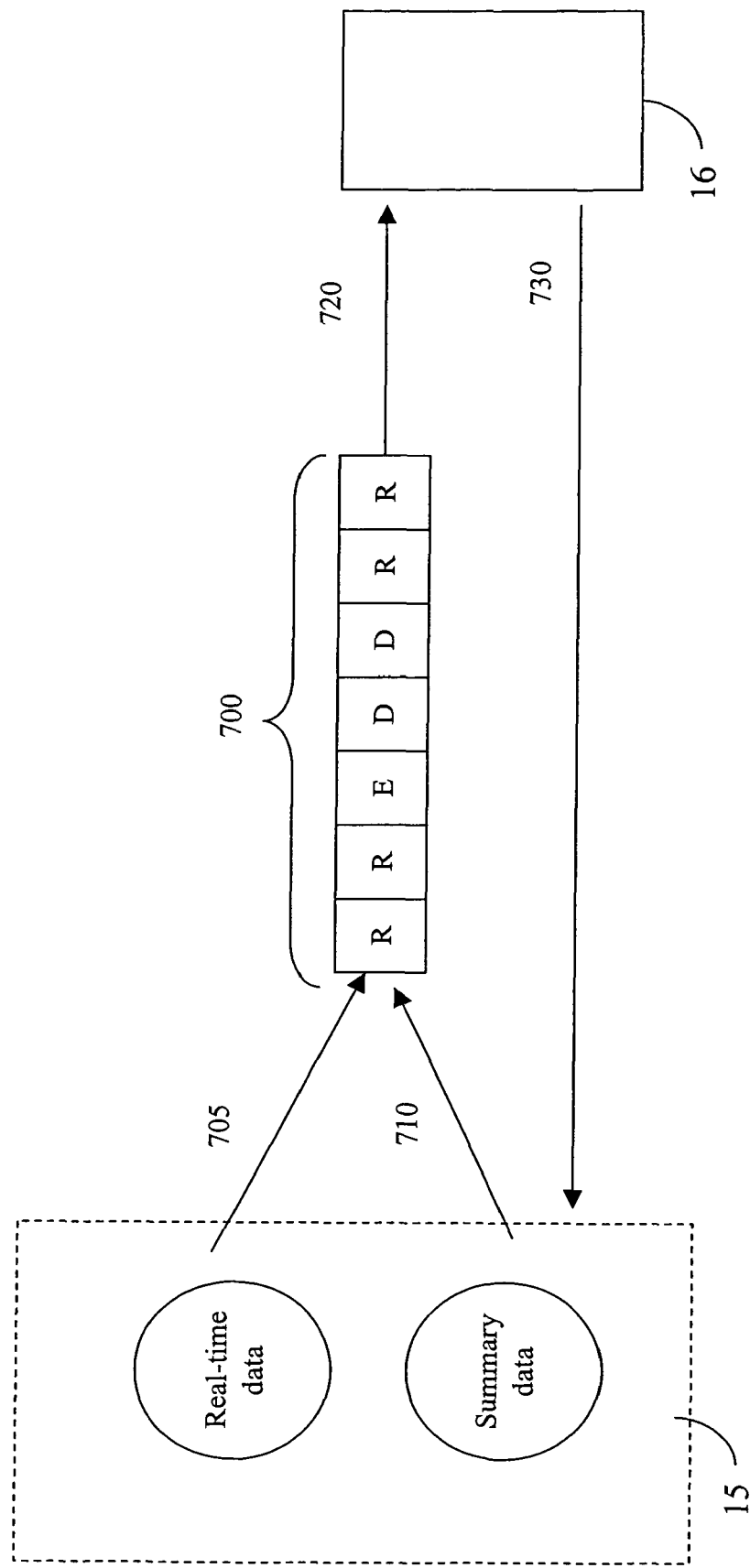
FIG. 14 is a schematic illustration of the priority filling (right-to-left) of a buffer by a real-time data source while a delayed data source waits.

As shown in FIG. 14, the flow control daemon 15 fills the buffer 700 using real-time data R from a real-time data source 705 (i.e., the holding area from the real-time status manager 12) when it is available, and using the summary data D from a delayed source (i.e., the summary table 600) when there is additional band-width. After a number of messages has been written to the buffer 700, the TCP/IP library sends data from the buffer 700 to the console 16 over link 720. Since TCP does not specify when the buffer will be emptied, the system includes messages E to be acknowledged that establish flow control. Such messages are acknowledged on link 730 which may be the same or a different socket or link 720.

Figure 15:
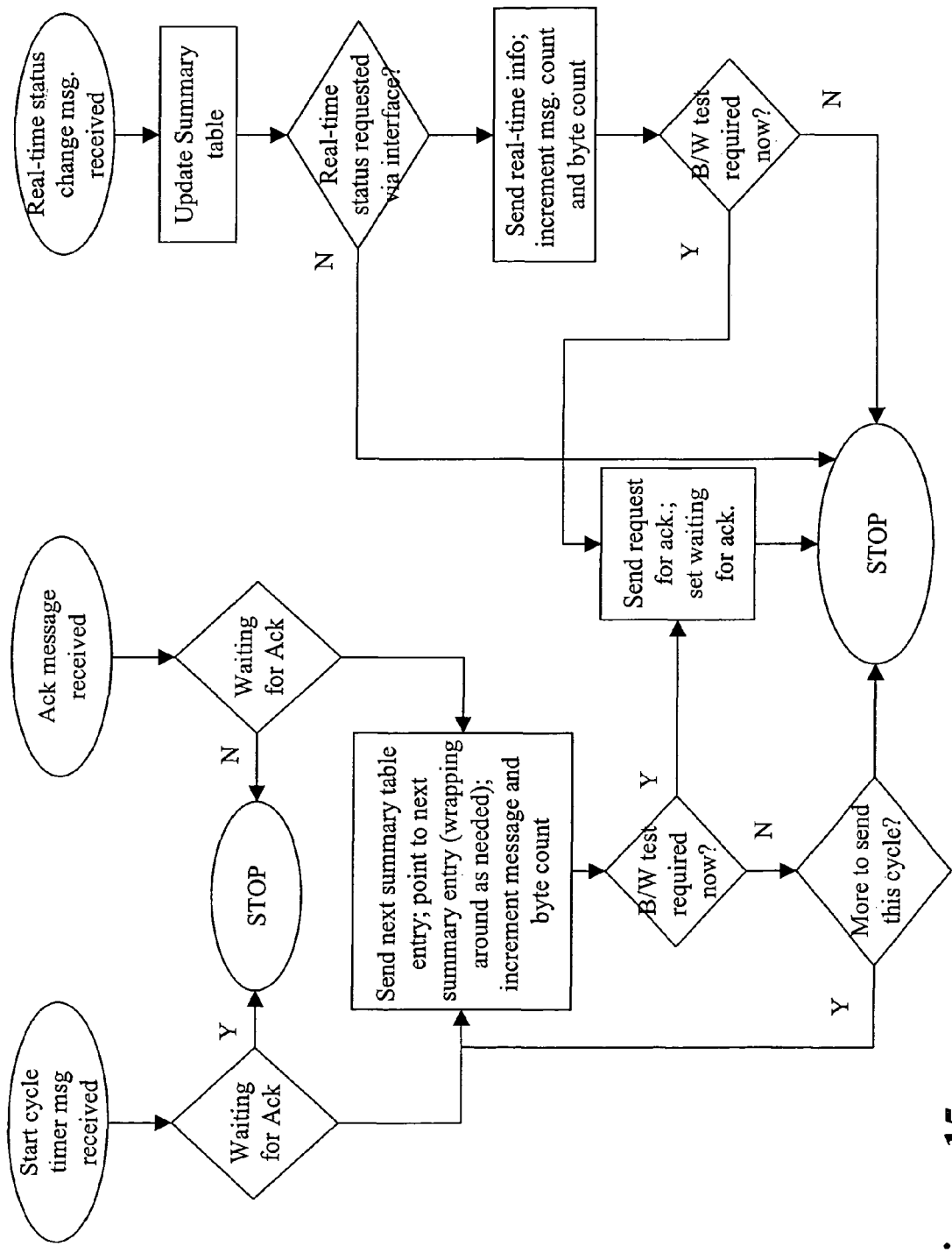
FIG. 15 is a flowchart showing the combined process of transmitting data and controlling bandwidth.

Generally, the combined transmission and flow control process of the present invention is shown in FIG. 15. FIG. 15 illustrates that if no other messages have been received, then the timer expired and there is sufficient bandwidth to send out a summary table entry. Otherwise, if a real-time message has been received (and the user is currently looking at them, then the real-time message has priority). All the while, bandwidth must be checked to make sure that there is sufficient available bandwidth to send the real-time data as it becomes available.

The network operations consoles 16A, 16B also include an input/output mechanism 23. The input/output mechanism 23 provides a mechanism through which the network operations consoles 16A, 16B can interact with external components. For example, the input/output mechanism 23 allows the printing of network status information reports to an external printer (not shown) as requested by the user through the network operating tool user interface 22.

As described above, the flow control daemon 15 receives all detailed network status change information from the real time status manager 12. In one embodiment of the present invention, this detailed network status information can be abstracted into a hierarchical representation of the information at increasing levels of resolution. For example, the users of network operations consoles 16A, 16B may only desire summary information on the network. In such a case, the network status may be reported as, for example, a percentage of the network that is busy, or a report of system-wide status based on the current state of the ports (e.g., 20% of the network ports have a status of 'idle', 10% of the network ports have a status of 'ringing', or 75 of 96 ports in use).

Figure 16:
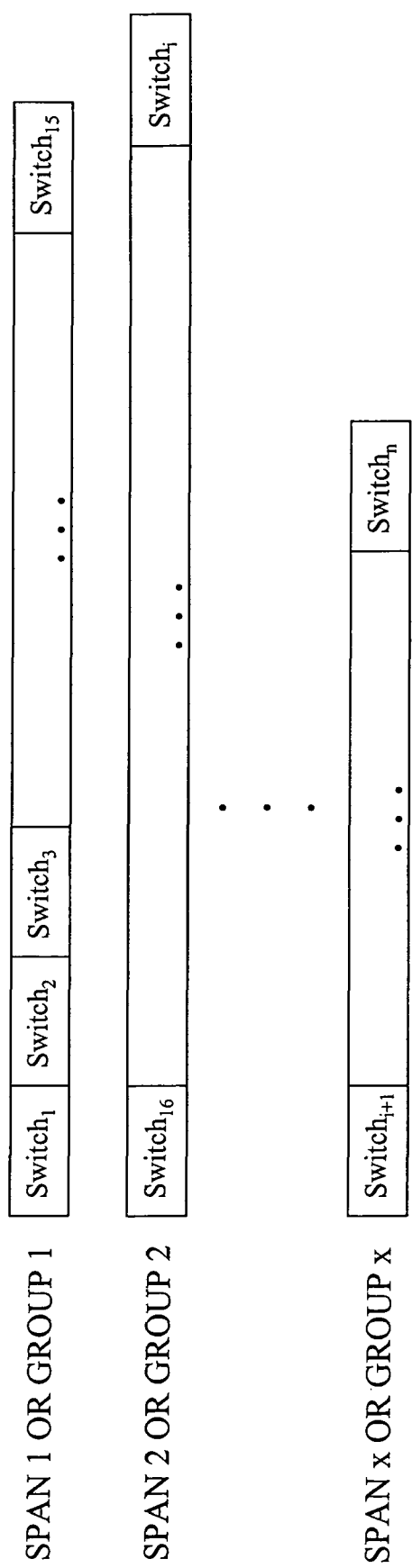
FIG. 16 is an exemplary data field structure showing a network status messages of a low level of resolution.

FIG. 16 shows an exemplary network status message at a low level of resolution, albeit more detailed than a summary report. As shown in FIG. 16, the network status message includes a data field corresponding to each switch 13A, 13B in the network. At this level of resolution, the individual statuses of each of the ports of each of the switches 13A, 13B would be rolled up to a single status attribute for that switch 13A, 13B. Information presented at this low level of resolution can indicate to the users of network operations consoles 16A, 16B, for example, that all ports of a particular switch 13A are experiencing no problems. With this information, the user of a network operations console 16A, 16B may decide that no further resolution as to the status of the ports of that particular switch 13A is required. Furthermore, the network status information can be viewed by the user in logical groupings of switches, as shown in FIG. 16.

Figure 17:
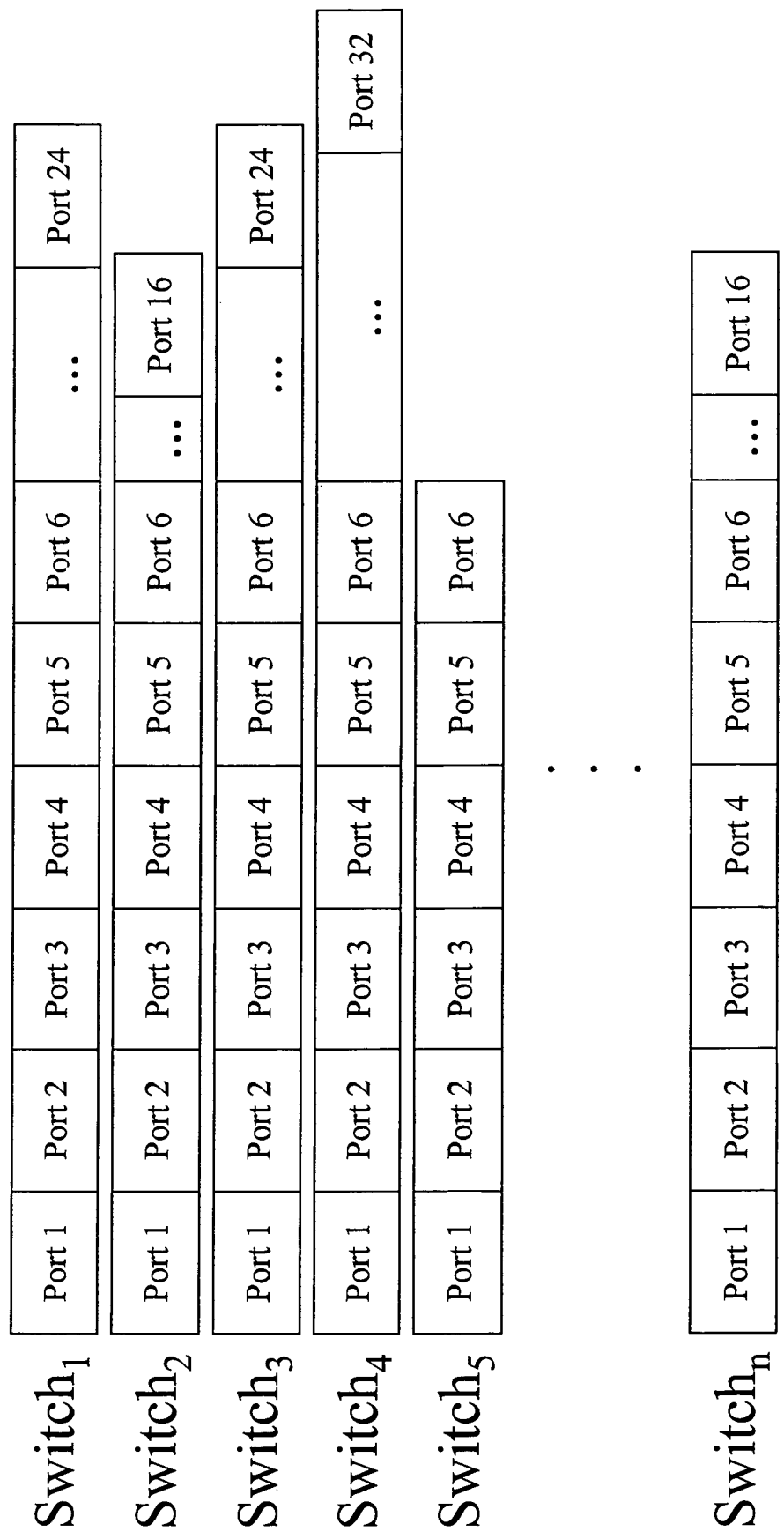
FIG. 17 is an exemplary data field structure showing network status messages of a medium level of resolution.

FIG. 17 shows a network status message of a medium level of resolution. As shown in FIG. 17, each network status message corresponds to a particular switch 13A, 13B. At this medium level of resolution, each port of a switch 13A, 13B (e.g., ports 1-24 for SWITCH$_1$) has a corresponding status attribute (e.g., idle, initialized, ringing, answered, hang-up, error) in the message. Accordingly, at this increased level of resolution, it would take n messages to report network status, whereas at a low level of resolution, it would take a single message.

FIG. 18 shows a network status message of a high level of resolution. As shown in FIG. 18, each network status message corresponds to a particular port of a particular switch 13A, 13B. At this high level of resolution, each port of a switch 13A, 13B has a corresponding status message. Each status message contains n attributes through which detailed information concerning a connection (e.g., customer number, account number, balance) to a particular port can be reported. Accordingly, at this high level of resolution, it would take 24 messages to report the status of a switch 13A, 13B with 24 ports (i.e., one message per port for each of the 24 ports), whereas at a medium level of resolution, it would take a single message to report the network status of a particular switch 13A, 13B.

As described above, the detailed network status information can be abstracted into a hierarchy of varying levels of detail. Therefore, the level of detail requested by the user through the network operating tool user interface 22, the configuration of the flow control daemon 15, and the level of detail of network status provided can be balanced so as to prevent data overrun between the flow control daemon 15 and the network operations console 16A, 16B, while still providing the user of the network operations console 16A, 16B with an appropriate level of network status information.

Figure 19:
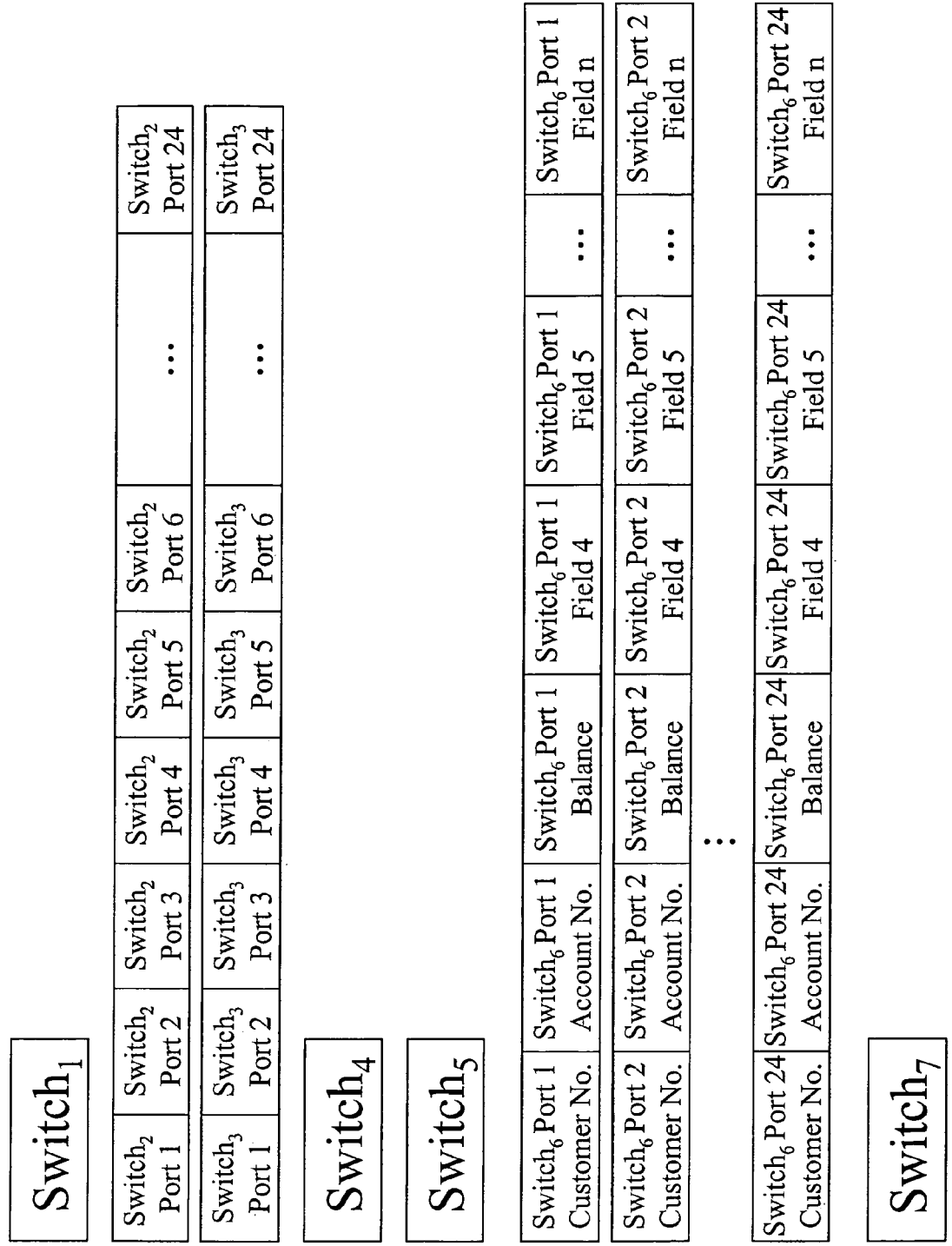
FIG. 19 is an exemplary time slice showing the varying levels of detail at which the network status information may be reported.

Furthermore, the level of detail of the network status information sent to a particular network operations console 16A, 16B by a flow control daemon 15 may vary across the network depending on the request made by the user. FIG. 19 shows an exemplary time slice showing the varying levels of detail at which the network status information may be reported to a particular network operations console 16A, 16B. As shown in FIG. 19, for an exemplary network consisting of seven switches 13A, 13B, the flow control daemon 15 may report network status at a low level of resolution for switches SWITCH$_1$, SWITCH$_4$, SWITCH$_5$, and SWITCH$_7$; at a medium resolution for SWITCH$_2$ and SWITCH$_3$; and at a high level of resolution for SWITCH$_6$.

The processes set forth in the present description may be implemented using a conventional general purpose microprocessor programmed according to the teachings in the present specification, as will be appreciated to those skilled in the relevant arts. Appropriate software coding can be readily prepared by skilled programmers based on the teachings of the present disclosure, as will also be apparent to those skilled in the relevant arts.

The present invention thus also includes a computer-based product which may be hosted on a storage medium and include instructions that can be used to program a computer to perform a process in accordance with the present invention. The storage medium can include, but is not limited to, any type of disk including floppy disks, optical disks, CD ROMs, magneto-optical disks, ROMs, RAMs, EPROMs, EEPROMs, flash-memory, magnetic or optical cards, or any type of media suitable for storing electronic instructions.

Figure 20A:
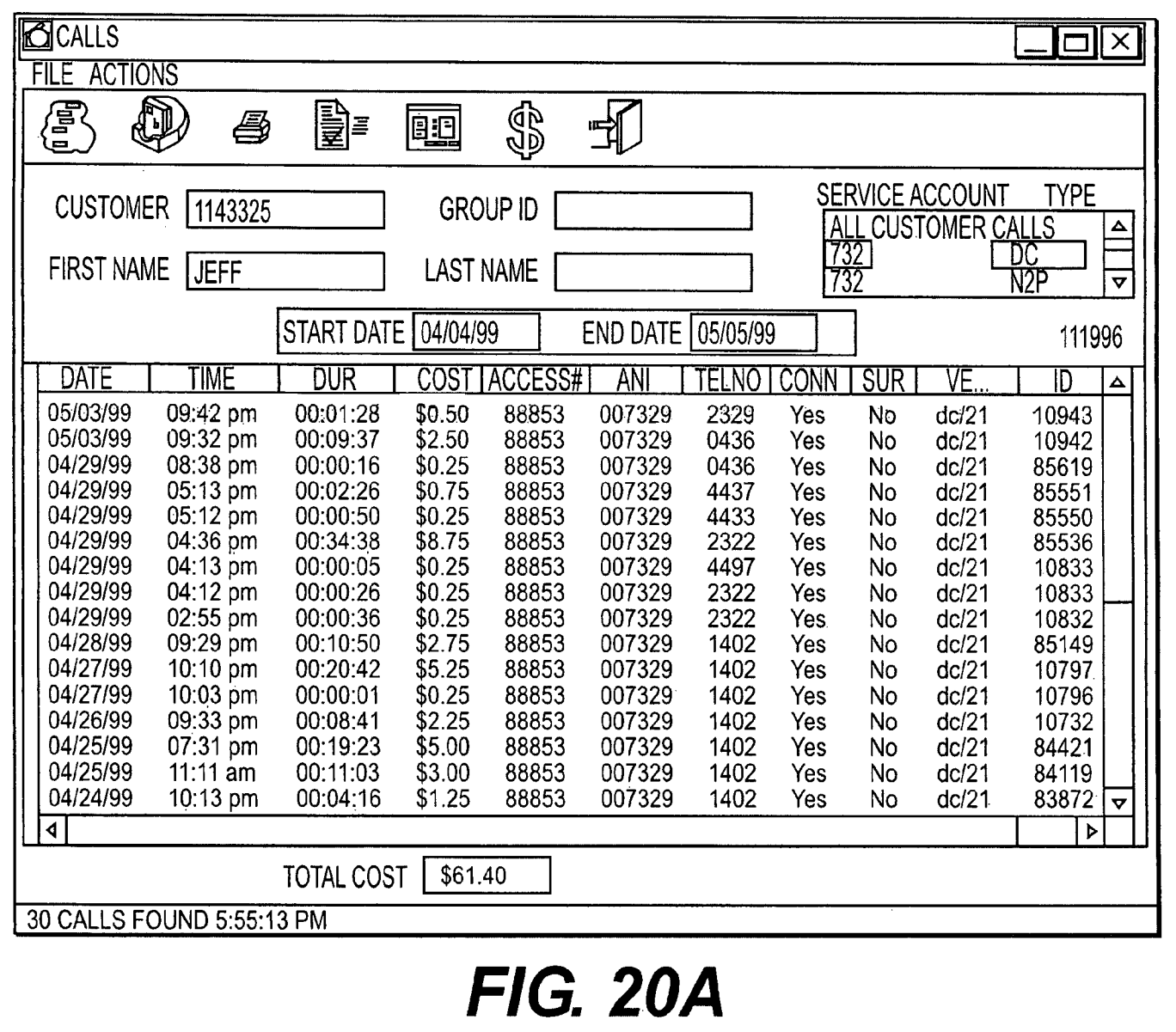
Figure 20B:
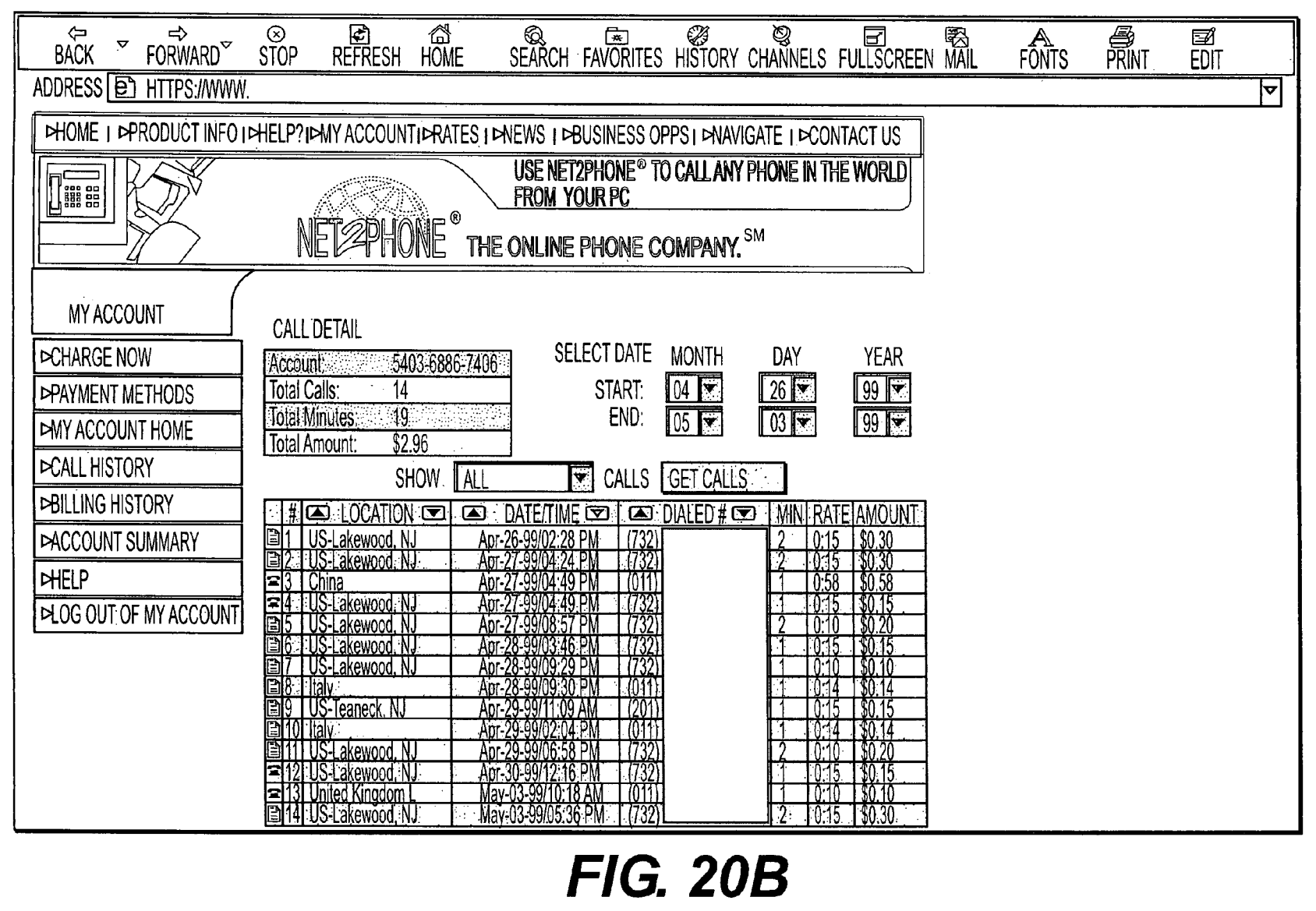
Figure 20C:
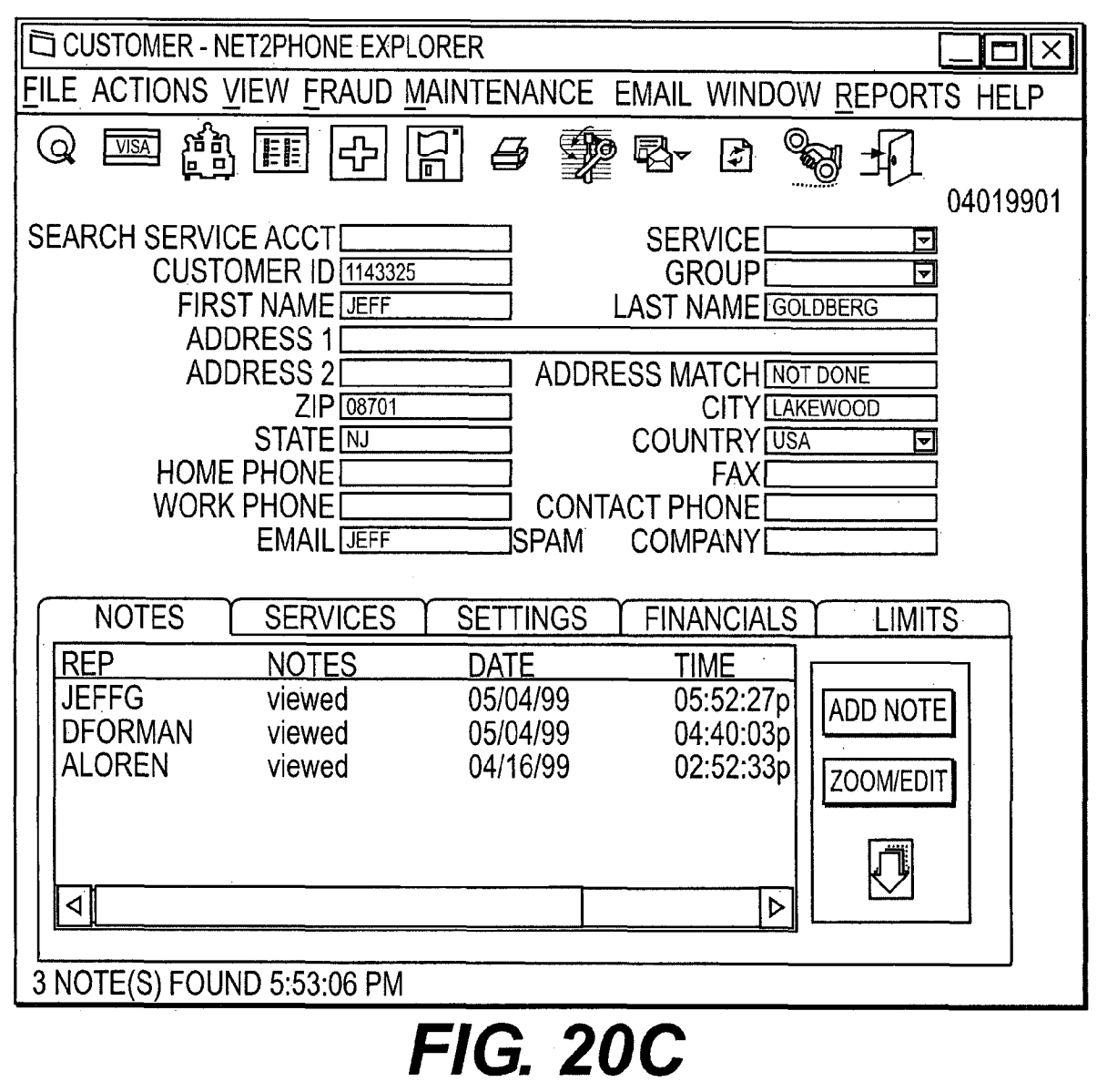

In addition to the real-time monitoring of calls, the system of the present invention can also query the real-time database daemon 17 for information about an account that is either entered manually or selected from one of the interface screens illustrated in FIGS. 7 and 8. As a result, the system displays at least one interface for showing a billing/call history associated with the specified account. Exemplary interfaces are shown in FIGS. 20A, 20B, and 20C.

When the system of the present invention also performs call rating/pricing, the system considers any one of the following: Pre-classification of special numbers (e.g. Help desk), dialed number (DN) Blocking (system wide: country, city, down to DN), *XXX Service codes (e.g. voice mail, *800 ad-calls), Call Center Identification, Country/City determination (incl. blocking per rate table), Rate Selection (Individualized customer to rate table mapping), and Surcharges (e.g., for ANI, DNIS, DNIS-Country, Fax, Info Digits: Operator, coin, prison). Similarly, the system can determine talk time (Hot Billing) and Route Selection and supports dynamically changeable rate tables. To keep costs low, the system chooses a least cost routing from a set of carriers to the best carrier to terminate the call in real-time. Rate-Table specific routing offers better quality routes based on price. Calls are automatically routed around T1's or Gateways that are having problems, have failed, or have been manually taken out of service for maintenance or upgrades. Remote Administration facilities enable tables to be maintained.

Obviously, numerous modifications and variations of the present invention are possible in light of the above teachings.

It is therefore to be understood that within the scope of the appended claims, the invention may be practiced otherwise then as specifically described herein.

The invention claimed is:

1. A computer implemented system for managing a flow of network status messages to a network operations console, comprising:
   a processor; and
   a computer readable medium encoded with processor readable instructions that when executed by the processor implement:
      a network status gathering mechanism configured to gather and ascertain network status information from a plurality of switches,
      a network status reporting mechanism configured to report said network status to said network operations console, and
      a network status reporting level determination mechanism configured to determine, on a switch by switch basis, a level of detail at which to report said network status to said network operations console based on a user request and a predetermined allocation of bandwidth for use in reporting network status.

2. A method of managing a flow of network status messages to a network operations console, comprising the steps of:
   gathering network status information from a plurality of switches;
   determining a reporting level, on a switch by switch basis, at which to report network status based on a user request and a predetermined allocation of bandwidth for use in providing network status; and
   providing network status to said network operations console at said reporting level from said determining step.

3. A system for managing a flow of network status messages to a network operations console, comprising:
   means for gathering network status information from a plurality of switches;
   means for determining a reporting level, on a switch by switch basis, at which to report network status based on a user request and a predetermined allocation of bandwidth for use in providing network status; and
   means for providing network status to said network operations console at said reporting level from said determining step.

4. A computer program product, comprising:
   a computer storage medium and an executable computer program code mechanism embedded in the computer storage medium for causing a processor to regulate a flow of network status messages to a network operations console when the executable computer code mechanism is loaded into a computer memory associated with the processor, the executable computer program code mechanism comprising:
   a first executable computer code device configured to gather a network status information from a plurality of switches;
   a second executable computer code device configured to determine a reporting level, on a switch by switch basis, at which to report network status based on a user request and a predetermined allocation of bandwidth for use in providing network status; and
   a third executable computer code device configured to provide network status to said network operations console at said reporting level determined by said second executable computer code device.

* * * * *